US012707300B2

(12) United States Patent
Bratu et al.

(10) Patent No.: US 12,707,300 B2
(45) Date of Patent: Aug. 11, 2026

(54) TEST SYSTEM FOR TESTING A CELL BROADCASTING SERVICE (CBS) SYSTEM

(71) Applicant: SIGOS GmbH, Nuremberg (DE)

(72) Inventors: Vlad Bratu, Nuremberg (DE); Aamir Ishaque, Lehrberg (DE); Ivana Knezevic, Nuremberg (DE)

(73) Assignee: SIGOS GmbH, Nuremberg (DE)

( * ) Notice: Subject to any disclaimer, the term of this patent is extended or adjusted under 35 U.S.C. 154(b) by 484 days.

(21) Appl. No.: 18/184,703

(22) Filed: Mar. 16, 2023

(65) Prior Publication Data

US 2024/0314597 A1 Sep. 19, 2024

(51) Int. Cl.
*H04W 24/08* (2009.01)
*H04W 28/02* (2009.01)

(52) U.S. Cl.
CPC ....... *H04W 24/08* (2013.01); *H04W 28/0268* (2013.01)

(58) Field of Classification Search
CPC .......................... H04W 24/08; H04W 28/0268
See application file for complete search history.

(56) References Cited

U.S. PATENT DOCUMENTS 7,831,249 B2 11/2010 Lohlein et al.
9,768,893 B1 9/2017 Wank et al.
10,097,981 B1 10/2018 Talaganov et al.
10,791,459 B1 9/2020 Hu et al.
10,848,562 B1 11/2020 Hu et al.
11,546,243 B1 1/2023 Menon et al.
2006/0046710 A1 3/2006 Lohlein et al.
2020/0366736 A1 11/2020 Hu et al.
2022/0060875 A1 2/2022 Pandey et al.
2022/0174467 A1* 6/2022 Lei ........................ H04W 52/02
2022/0245673 A1* 8/2022 Walters .................. G06N 3/092
2022/0330057 A1 10/2022 Bratu et al.

FOREIGN PATENT DOCUMENTS

WO 2004049746 A1 6/2004
WO WO-2020255150 A1 * 12/2020 ......... H04L 12/4633
WO WO-2021198277 A1 * 10/2021 ............ H04W 24/06
WO 2024189062 9/2024

OTHER PUBLICATIONS

Deutsches Patent und Markenamt (German Patent and Trademark Office), Office Action in related application DE 10 2023 202 374.1, and machine translation thereof.
"International Application Serial No. PCT EP2024 056626, International Search Report mailed Jun. 18, 2024", 3 pgs.
"International Application Serial No. PCT EP2024 056626, Written Opinion mailed Jun. 18, 2024", 9 pgs.

* cited by examiner

*Primary Examiner* — Said M Elnoubi
(74) *Attorney, Agent, or Firm* — Schwegman Lundberg & Woessner, P.A.

(57) ABSTRACT

A test system serves for testing a cell broadcasting service (CBS) system. The test system has a triggering module to initiate a desired CBS message and a coordination module to coordinate a flow of the triggered CBS message in at least one type of mobile network (GSM, UMTS, LTE, 5G). At least one test probe interface module of the test system is connected to the mobile network to detect a delivery of the triggered and coordinated CBS message. A test system results having enhanced capabilities to enable the testing of a cell broadcasting service.

9 Claims, 1 Drawing Sheet

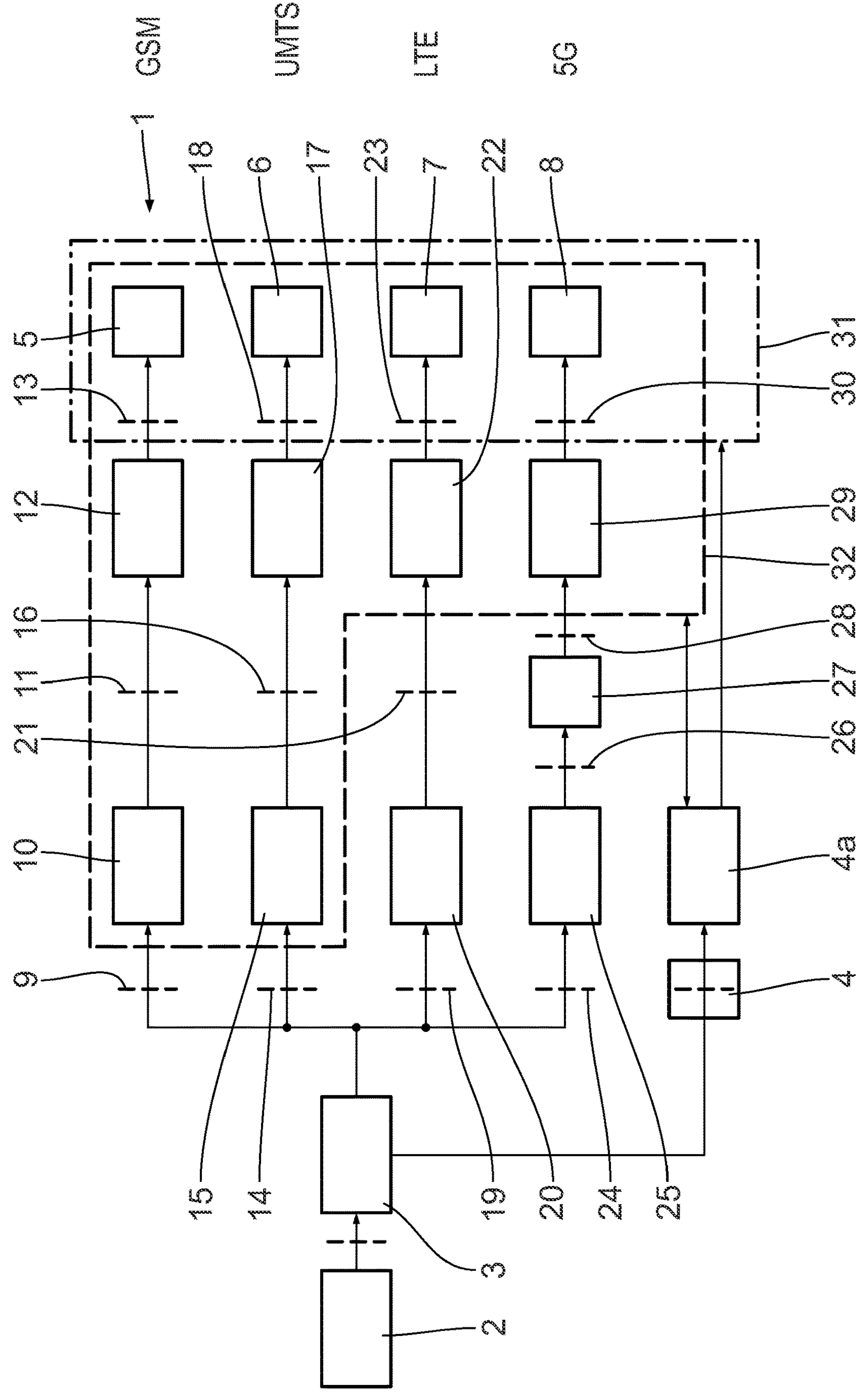
GSM
UMTS
LTE
5G
1
2
3
4
4a
5
6
7
8
9
10
11
12
13
14
15
16
17
18
19
20
21
22
23
24
25
26
27
28
29
30
31
32

TEST SYSTEM FOR TESTING A CELL BROADCASTING SERVICE (CBS) SYSTEM

FIELD OF THE INVENTION

The invention relates to a test system for testing a cell broadcasting service (CBS) system. Further, the invention relates to a test method for testing a cell broadcasting service using such test system.

BACKGROUND OF THE INVENTION

Test systems for mobile networks are known e.g. from US 2022/0330057 A1, from U.S. Pat. No. 10,791,459 B1, from U.S. Pat. No. 10,848,562 B1, from U.S. Pat. No. 9,768,893 B1, from U.S. Pat. No. 10,097,981 B1, from U.S. Pat. No. 7,831,249 B2 and from WO 2004/049746 A1.

SUMMARY OF THE INVENTION

As a part of Mobile Network Public Warning System (PWS), mobile operators are using Cell Broadcasting Services (CBS). The 3rd Generation Partnership Project (3GPP) standardized solution, CBS, enables mobile network operators to send emergency and alert messages to multiple phone users, in a defined area, at the same time. The CBS is supported by different technologies 2G, 3G, LTE, 5G.

The Cell Broadcast (CB) Services belong to the mission critical communications, and as such are regulated by government and regulatory bodies, such as the Federal Communication Commission (FCC). It was deemed in public interest to devise a way to instantly provide disaster information through the handheld mobile terminals, which can distribute information reliably in a broad range. An initiative at 3GPP lead to a warning message distribution platform called the Public Warning System (PWS). In a follow up, 3GPP has standardized the Earthquake and Tsunami Warning System (ETWS) for mobile technologies in widespread use today.

Knowing that government/emergency authority and infrastructure providers are using these mission critical services, brings to the point that there is a need for a system, which is going to actively test Cell Broadcast Services (CBS) and to ensure that CBS will work as expected. The correct transmission of the CBS messages and their validation, based on specific words or partial strings, is essential for the efficacy of public waring systems.

It is therefore an object of the invention to enhance the capabilities of such a test system to enable the testing of a cell broadcasting service (CBS).

This object is met by a test system for testing a cell broadcasting service (CBS) system

- having a triggering module to initiate a desired CBS message,
- having a coordination module to coordinate a flow of the triggered CBS message in at least one type of mobile network (GSM, UMTS, LTE, 5G),
- having at least one test probe interface module connected to the mobile network (GSM, UMTS, LTE, 5G) to detect a delivery of the triggered and coordinated CBS message.

This object is further met by a test method for testing a cell broadcasting service using a test system according to the invention including the following steps:

- initiating a flow of a cell broadcasting message between a cell broadcasting center (CBC) and a terminal test probe at least via the following triggering modes:
  - triggered via a script controlled by the CBC and
  - triggered via the triggering module of the test system.

The test system may be capable to test and monitor CBS networks quality of service (QOS) and/or quality of experience (QoE) from an end to end (E2E) perspective. The test system may be applicable for lab CBS networks and also for live CBS networks. The test system may be integrated into a continuous integration and/or continuous delivery and/or continuous deployment (CI/CD) process.

Use of the triggering module of the test system makes it possible to initiate a flow of a cell broadcasting message to be tested at a desired point or period in time. The triggering module to that end may be in signal connection with a cell broadcasting center (CBC) of the cell broadcasting service system. Further functions of the coordination module of the test system may be monitoring the CBS messages and/or extracting CBS message parameters and/or checking a validity and/or integrity of such messages and/or message parameters. Further functions of the triggering module may be control of interactions with a CBS system and/or monitoring a completion of the broadcast. Further, the triggering module may have the function of a termination of the broadcast.

The triggering module may serve as an external testing entity which is in signal connection to the cell broadcasting center of the cell broadcasting center of the cell broadcasting service system.

An API module as triggering module enables an interaction of the test system with third parties systems, functions or software.

External components which may interact with the test system via an API may be externally programmed network functions, third party systems or DevOps tools. As such API may establish an interface between an external user software to the test system, the API is an example of the at least one user interface of the test system. The API may be a RESTful API. With respect to RESTful API, it is referred to the English Wikipedia entry "representational state transfer" in the version of Mar. 17, 2021 and the references cited there. The test system including the API may be integrated in a CI/CD pipeline. With respect to CI/CD pipeline and to DevOps, it is referred to the English Wikipedia entry "CI/CD" in the version of Mar. 23, 2021 and the references cited there.

A test system, wherein the triggering module comprises a command line interface and/or a web-based client enables an interaction of the test system with external sites.

Test probes embodied from at least one of the following types

- Smartphone test probe;
- Radio test probe;
- Core network test probe have been proven to be particularly useful. In that respect, it also is referred to US 2022/0330057 A1.

Data storage means which are included in the test probe enable later access to the data flow. Data to be stored within the data storage means may be at least a part of the delivered CBS message and/or a logfile monitoring the cell broadcasting message flow.

Mobile networks currently are used and therefore need to be tested. The mobile test system, embodied to test the CBS data flow in at least one mobile network of the following types: GSM, UMTS, LTE, 5G, may be specialized for exactly one of those mobile networks or may be a test system capable to interact with a plurality of those mobile network types.

The advantages of a test method according to the invention correspond to those explained about with respect to the test system.

With such test method, autonomously triggered cell broadcasting messages can be tested and also cell broadcasting messages triggered via the CBC itself.

With a test method, wherein during the test method, the flow of a cell broadcasting message between the cell broadcasting center (CBC) and a user equipment further is tracked such flow being initiated by a live CBS message from an emergency source, in addition real life CBS messages triggered by external events can be tested.

With the test method, wherein via an API module components external to the mobile network to be tested are controlled and/or configured to execute tailored automated tests sequences, an interaction between third party applications and the test system is enabled. With such interaction, tailored automated test sequence are provided which fit to respective testing demands. The API used may be a RESTful API. The test method may be integrated in a CI/CD pipeline. In particular, a control and configuration of a data extraction and of measurements of the test system is possible with such test method.

An extraction of key performance indicators (KPIs) according to the invention enables additional and/or comparative test analysis steps. Examples of such KPIs are identified in U.S. Pat. No. 10,791,459 B1.

Examples for external components which may be controlled and/or configured with such method are third party systems, DevOps tools and/or further added 5G network functions.

The network under test may be a roaming network.

The network under test may send CB messages to home subscribers or inbound roamers. Such inbound roamers also can be tested.

Exemplified embodiments of the invention herein after are described with reference to the accompanying drawings.

BRIEF DESCRIPTION OF THE DRAWINGS

FIG. 1 schematically main components of a test system for testing a cell broadcasting service (CBS) system having different trigger modes for triggering a cell broadcasting message.

DETAILED DESCRIPTION

A test system 1 serves to test a cell broadcasting service (CBS) system. Exemplified components of such CBS system are shown in FIG. 1 as a cell broadcast entity (CBE) 2 and a cell broadcast center (CBC) 3. Details with aspect to such CBS system can be found in the technical specification 3GPP TS 235 041 V18.0.0, 2022.

The test system 1 includes a triggering module 4 to initiate a desired CBS message to be generated by the cell broadcast center 3. The triggering module 4 is embodied as an application programming interface (API) module. The triggering module 4 enables an interaction of the test system 1 with third parties' systems, functions and software.

Alternative or in addition to the API module 4, the test system 1 can be equipped with a command line interface and/or may have a web-based client. Further, the API module 4 may interact with a CBC control interface.

Further, the test system 1 has a coordination module 4*a* to coordinate a flow of the triggered CBS message in several types of mobile networks. Such mobile networks in FIG. 1 are indicated with their designations GSM, UMTS, LTE and 5G which are attributed in FIG. 1 to the linewise communication flow between the CBC 3 and a respective terminal device 5, 6, 7, 8 which indicates that the GSM mobile network is embodied as a mobile station MS and in case of the other mobile networks UMTS, LTE and 5G is embodied as user equipment (UE) 6 to 8.

These terminal devices 5 to 8 are designed as terminal test probes of the test system 1. Such terminal test probes 5 to 8 of the test system 1 are connected to the respective mobile network GSM, UMTS, LTE, 5G to detect a delivery of the triggered and coordinated CBS message from the CBC 3 to the respective terminal test probe 5 to 8 using the mobile network GSM, UMTS, LTE and 5G. The terminal test probes 5 to 8 may be embodied as smartphones.

The coordination module 4*a* further monitors the flow of the respective CBS messages and serves to extract CBS message parameters and to check the validity and integrity of such parameters.

The triggering module 4 further controls interactions with the CBS system and serves to monitor a completion of the respective broadcast. Further the triggering module 4 serves to terminate the broadcast.

The flow of the CBS message within the GSM mobile network is via a Cb interface 9, a base station control (BSC) 10, an Abis interface 8 and a base transceiver station (BTS) 12 and further via an Um interface 13. Details of these GSM components and interfaces can be found in the technical specification ETSI TS 144 018 V10.3.0, 2011.

The flow of the CBS message between the CBC 3 and the terminal test probe 6 in the UMTS mobile network is via an IuBc interface 14, a radio network controller (RNC) 15, an Iub interface 16, a NodeB station 17 and a Uu interface 18. Details of these UMTS components and interfaces can be found in the technical specification ETSI TS 123 121 V3.6.0, 2002.

The flow of the CBS message from the CBC 3 to the terminal test probe 7 in the LTE mobile network is via a SBc interface 19, a mobility management entity (MME) 20, a S1 interface 21, an eNodeB station 22 and an Uu interface 23. Details of these LTE components and interfaces can be found in the technical specification ETSI TS 129 168 V12.9.0, 2016.

The flow of the CBS message from the CBC 3 to the terminal test probe 8 in the 5G mobile network is via an SBc interface 24, a PWS-IWF (public warning system-interworking function) 25, a N50 interface 26, an access and mobility management function (AMF) module 27, an N2 interface 28, a gNB station 29 and an Uu interface 30. Details of these 5G components and interfaces can be found in the technical specification ETSI TS 123 041 V16.4.0, 2020.

The terminal test probes 5 to 8 together with the interfaces 13, 18, 23 and 30 are part of a test probe interface module 31 of the test system 1. Such test probe interface module 31 is in bidirectional signal connection with the coordination module 4*a*.

The BSC 10, the Abis interface 11 and the BTS 12 are part of a GSM core network test probe of the test system 1. The RNC 15, the Iub interface 16 and the NodeB station 17 are part of an UMTS core network test probe of the test system 1. The eNodeB 22 is part of a LTE core network test probe of the test system 1. The gNB 29 is part of a 5G core network test probe of the test system 1.

These core network test probes of the GSM, UMTS, LTE and 5G mobile networks are part of a core network test probe interface module 32 of the test system 1.

With aspect to details of the test probe interface module 31 and the coordinate test probe interface module 32 it is also referred to US 2022/0 330 057 A1.

Further, the test system 1 may include at least one radio test probe which is part of a radio test probe interface module. For details in that respect, again, it is referred to US 2022/0 330 057 A1.

The respective terminal test probe/core network test probe/radio test probe includes data storage means. Data to be stored includes content from the respectively delivered CBS message and/or a logfile protocolling the flow of the respective CBS message.

During a test message to test a cell broadcasting service delivered with the CBS system using the test system 1, the flow of the cell broadcasting message between the CBC 3 and the respective user equipment which is emulated via the respective terminal test probe 5 to 8 is tracked at least via one of the following trigger modes:

1. A triggering via a script controlled by the CBC 3.
2. A triggering via the triggering module 4 of the test system 1.

The triggering module 4 serves as an external testing entity, which is in bidirectional signal direction with the CBC 3.

During the test method, the flow of the cell broadcasting message between the CBC 3 and the respective test probe 4 to 8, further may be tracked in case such flow is initiated by a live CBS message from an emergency source, e.g. the CBE 2.

In particular, the test method for the validation and monitoring of the CBS message uses:

1. the test system 1 to coordinate the flow of CBS message in mobile network and intercept the signaling messages to extract CBS message parameters and check its validity and integrity,
2. the triggering module 4 to automate the interactions with CBS system by initiating the desired cell broadcast message and upon completion, issuing the commands to CBS to cancel the broadcast, and,
3. the respective test probe of the test probe interface module 31 and/or the core network test probe interface module 32 to detect and store the delivery of CBS message on either mobile core or radio interface.

The test system 1 provides tools and methods that can automate and interact with third party systems, functions, or software. The test system 1 provides:

Methods to automate interactions and control with the APIs exposed by third party systems, tools, and software.

Methods to automate the interaction with Command Line Interfaces exposed by third party systems, tools, and software.

Methods to automate interaction with Web-based applications.

These methods enable the test system to perform a closed loop testing scenario where the test system interacts with CBS to fully control a messaging flow in a respective mobile technology.

In the reference to the triggering CBS messages, there are, as briefly mentioned above, three possible options:

1) Live CBS messages sent by network under specific circumstances for various purposes, including specific emergency notifications. A plausible scenario is that an automotive source sends a traffic report as broadcast message in a target geographical area.
2) Autonomously initiated CBS messages via a command interaction tool, like a shell script that requests the CBS to initiate broadcast messages with predefined periodicity, or else in a coordinated pattern known apriori to the testing system 1.
3) Testing system itself controls both sides in E2E manner by requesting directly via the triggering module 4 when a test CBS message is to be sent and simultaneously keeps the interface under test ready in the preset time frame to capture the broadcast signaling on the test interface, i.e., for LTE, S1 interface in case of core probing or Uu interface in case of radio probing mechanisms.

With option 3) and as referred in FIG. 1, the test system may send API calls to Cell Broadcast Center (CBC) using industrial standard protocols, like REST API to the interfaces exposed by CBC implementation by the supplier.

In particular, FIG. 1 depicts the E2E solution for CBS testing employing an API call to CBC for handling a warning message initiation and termination. FIG. 1 illustrates the deployment of the test probe interface module 31 and the core network test probe interface module 32 and the triggering mechanism to start the procedure for CB transmission by automated interaction with CBC via an exposed API. Further, a radio test probe interface module may be part of the test system 1. With respect to details of an example for such radio test probe interface module, it is referred to US 2022/0330057 A1. The CBS testing mechanism using core and/or radio probes validates the reception of warning messages and associate signaling over the air in live or lab networks.

A Core Test Probe of the core network test probe interface module 32 is an embodiment of RAN components to validate interface specific functionalities that require transactions with core nodes over A, Iu, S1 and N2 in GSM, UMTS, LTE and 5G networks respectively. By emulating RAN and MS/UE, the core test probes abstract radio influence allowing the testing to focus solely on the validation of a specific interface between RAN and Core subsystems. The nodes emulated in core test probes are in fact located directly in the distribution path of the CBS message between CBC and MS/UE. One testing scenario applicable to LTE network is that if the CBC and MME pair is handling the CBS signaling according to the specification requirements.

The Test Probes 5 to 8 operate with the real devices, i.e. smartphones. By controlling and configuring the smartphone and its screen, the testing can be done on application level, simulating the end user behavior, and validating quality of experience received by the end user. The testing is based on the recorded list of subsequent actions, that emulate the end user behavior, running automatically 24/7. The Key Performance Indicators can be defined by the tester.

With this approach, CBS messages can be tested and validated from the end user perspective, and how it appears on different devices, different radio technologies, different OS (operating system) device versions. Such a testing method can validate the appearance, format, validity, and accessibility of the Cell Broadcast messages.

A Radio Test Probe comprises of a suitable modem together with external Application and Functions in an active test system providing a test method for verification of CBS messages on GSM, UMTS, LTE or 5G devices.

In GSM, the CBS warning messages are delivered over CBCH (basic and extended channel). Contrary to higher generations, on Um radio interface, the segmentation of SMS cell broadcast takes place splitting the 82 octets into four CBCH blocks.

In UMTS CBS messages are transmitted over layer two logical channel CTCH of UTRAN.

Both in GSM and UMTS, the cell broadcast service can be used for CBS message transfer.

E-UTRA connected to both EPC and 5GC (5G-NSA deployment) may receive warning messages from both networks and duplication avoidance is handled by UE.

The stack of technology-specific core test probe focuses on the signaling behavior of the interface in question. Based on standardized architecture and current requirements for CBS, the core network elements like MSC, VLR, HLR etc. are not involved for the service delivery. The 5G architecture only covers the topology with CBC & PWS-IWF. Another option is that of network functions interacting with each other with using PWS-IWF through the deployment of CBCF (cell broadcast center function).

There could be multiple CBCs in system and one CBC can be connected to more than one BSC, RNC, MME, PWS-IWF. However, the back mapping is one-to-one implying that one MME can be connected to one CBC only. One MME however may simultaneously send warning messages to multiple eNodeBs based on area coordinates.

UE/MS in all technologies is expected to utilize a common duplication detection mechanism by identifying the messages where the serial number of a newly received message matches with that of on older message; both being associated to the same message identifier.

Each page of a CBS Message sent to the MS/UE is a fixed block of 88 octets. 2 octets are reserved for serial number, 2 for message identifier, 1 for data coding, 1 for page (or message type) parameters and the remaining 82 octets for the payload (or CB data) that contain the content of the message. Except GSM, the CB data consists of Write-Replace primitive parameters (like number pages) in addition to warning message content.

Message identifier (MI) classifies the source and type of the CBS message. The MS/UE shall attempt to receive the CBS messages whose MI are in the "search list" stored in files on SIM card. There are some dedicated MIs associated to warning types like earthquake, tsunami notifications etc., while others like in HEX range A000 to AFFF are left on PLMN's discretion.

The test CBC, for the Required Monthly Testing needs, have MI for ETWS HEX 1103 and for Commercial Mobile Alert System (CMAS) HEX 111C. If this MI is in the "search list", the MS/UE may attempt to receive this CBS message.

Serial number (SN) comprises of Geo code (GC) to limited geographic scope of CBS message, message code (MC) to distinguish CBS messages with same MI but containing different themes whereas update code is mapped to the revision of CBS message with same MI, GC and MC combination.

The ETWS Primary Notification (EPN) message is transmitted to a MS/UE in idle mode and is conveyed by the paging message which can invoke mobile terminals to start receiving CBS message.

With the radio probing, a coordinated warning message test can be used to validate at the terminating side the following events related to a CBS warning message transfer:

1) If the expected warning message was received (and reassembled in case of GSM) successfully by the UE attached to GSM, UMTS, LTE or 5G NR.
2) If the message arrived in the intended geographic scope, e.g., location, cell ID or warning area list.
3) If the message attributes can be matched, including but not limited to MI or SN.
4) If the message content matches the expected text.
5) If the message was terminated successfully under preset conditions.
6) If the latency of the message reception and termination was within desirable range.

Following this approach, the test system can validate the message path in core and radio as well as make detailed time measurements on the latency. For example, the duration between CBS request sent to CBC and the time stamp when the message arrives at MS or UE.

In addition, the cancel procedure can be automated by appropriate calls and the arrival of notification at MS/UE.

Steps involved in the warning message distribution in the core network and delivery to RAN are illustrated in the following example with the presumption of LTE core:

1) CBC receives an emergency broadcast request for a warning message from an information source (a PSAP, Regulator, weather agency etc.) via an interface from CBE or another node, with this latter interface not standardized by 3GPP.
2) CBC is expected to authorize this request, and thereafter using the area information CBC decides which MME to contact and issues Write-Replace Warning Request containing the warning notification in addition to other attributes (like MI, SN, warning area list and so forth) to MME(s).
3) MME responds with a confirmation message that indicates to CBC that MME has started distributing the warning message to the target eNodeBs. CBC upon reception confirm CBE of that the distribution has started.
4) The eNodeB broadcasts the message to eNodeB frequently according to the attributes set by CBC in message distribution i.e., the period parameter.
5) If the UE has been configured to receive the warning message (according to the MI), the UE will extract warning type value and immediately alert the subscriber. Note that a UE may be configured to ignore test message (with MI HEX 1103) by default. If the warning area coordinates (cell IDs, area list) are present, UE may decide based on its location. If the UE moves out of the geographical scope of the message, it may decide to turn off the notification. Finally, the UE should handle duplicate or repeated warning messages as per specification.
6) If Send Warning-Message-Indication parameter was present in Write-Replace Warning Request and it is configured in the MME based on operator policy, MME shall forward the Broadcast Scheduled Area Lists in a Write-Replace Warning Indication(s) to the CBC.
7) The cancel warning message delivery procedure takes place when CBE requests to stop the on-going broadcast of warning messages. The MME shall use the Tracking Area ID list to determine the eNodeBs with active broadcast ongoing. In case the Tracking Area ID list is not included the Kill Request is forwarded to all eNodeBs that are connected to the MME.
8) The designated eNodeB shall stop broadcasting the warning message identified MI and SN in the areas identified by Warning Area ID.

Regarding step 1), a trigger may be created on the CBC to start the process of the CBS message transmission.

As the CBS message can be intercepted by test probes on various stages (core or radio sub-systems), a very precise and detailed information can be extracted by this test method and formatted into user-presentable Key Performance Indicators (KPIs):

1. The received warning message content matches original text.
2. Confirmation that the message is not corrupted, in unsuitable data coding scheme in reception, and indicates a relevant subject matter in a message identifier (MI) search list.
3. Warning area information correlates with the cell(s) or tracking area of the mobile network in which the message was intended to be broadcasted.
4. Detection of a CBS message in "test" category i.e., ETWS message with MI in HEX=1103.
5. Unix timestamp of the CBS specific events taking place on a respective interface under test
   This may lead to a given delay between a CBS message transmission from CBC and a message arrival at a respective terminal, in particular at UE.
   Certain key messages on core interfaces, for instance Write-Replace-Warning-Request and KillRequest from MME to eNodeB can be logged.
6. Parameters specific to the cell broadcast service, for instance but no limited to MI, SN, Pages, Repetition period and Data Coding Scheme (DCS) coding. DCS refers to a one-octet field in Short Messages (SM) and cell broadcast messages (CB) which carries a basic information how a recipient handset should process the received message.
7. Duplication detection if it happened during the test execution snapshot. Several criteria can be used with most common being to check whether the SN associated with MI of the new message matches the SN of the former CBS messages received by the same UE.

A PCAP file of transactions (for example between eNodeB and MME in case of LTE core) may be provided as result file.

What is claimed is:

1. A method for testing a cell broadcasting service (CBS), the method comprising:

initiating, using a triggering module in signal connection to a cell broadcasting center (CBC), a flow of a cell broadcasting service (CBS) message between the CBC and a terminal test probe, the initiating at least via one of a script controlled by the CBC, or the triggering module;

monitoring, using the triggering module, the flow of the CBS message to detect when the flow is complete;

in response to detecting completion of the flow, terminating the CBS;

coordinating, using a coordination module, the flow of the CBS message in at least two mobile networks; and detecting, in each test probe of at least two test probes of a test probe interface module, a delivery of the CBS message, wherein the test probe interface is in signal connection with the coordination module, and wherein each test probe is connected to a respective mobile network different from each other, and wherein each test probe of the at least two test probes includes a data storage configured to store at least one of CBS message content or a logfile of the flow of the CBS message.

2. The method according to claim 1, wherein the flow of a cell broadcasting message between the CBC and a user equipment is tracked when the flow is initiated by a live CBS message from an emergency source.

3. The method according to claim 1, wherein, via an Application Programming Interface (API) module, components external to the mobile network to be tested are controlled and/or configured to execute tailored automated tests sequences.

4. The method according to claim 1, including an extraction of key performance indicators.

5. The method according to claim 1, further comprising:

extracting, using the coordination module, CBS message parameters of the CBS message.

6. The method according to claim 5, wherein the CBS message parameters include at least one of a message identifier (MI), a serial number (SN), a number of pages, a repetition period, or a Data Coding Scheme (DCS).

7. The method according to claim 6, further comprising:

checking, using the coordination module, at least one of a validity of each of the CBS message parameters or an integrity of each of the CBS message parameters.

8. The method according to claim 1, further comprising:

checking, using the coordination module, at least one of a validity of the CBS message or an integrity of the CBS message.

9. The method according to claim 1, wherein the at least one mobile network includes at least one of a Global System for Mobile Communications (GSM) network, a Universal Mobile Telecommunications System (UMTS) network, a Long-Term Evolution (LTE) network, or a fifth generation (5G) network.

* * * * *